US010551548B2

(12) United States Patent
Lee et al.

(10) Patent No.: US 10,551,548 B2
(45) Date of Patent: Feb. 4, 2020

(54) BACKLIGHT UNIT AND DISPLAY APPARATUS INCLUDING THE SAME

(71) Applicant: SAMSUNG DISPLAY CO., LTD., Yongin-si, Gyeonggi-Do (KR)

(72) Inventors: Kwangkeun Lee, Osan-si (KR); Youngmin Kim, Asan-si (KR); Yeongseok Kim, Seoul (KR); Haeil Park, Seoul (KR); Seon-Tae Yoon, Seoul (KR); Junhan Lee, Seoul (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 16/238,641

(22) Filed: Jan. 3, 2019

(65) Prior Publication Data

US 2019/0204495 A1 Jul. 4, 2019

(30) Foreign Application Priority Data

Jan. 3, 2018 (KR) ........................ 10-2018-0000843

(51) Int. Cl.
*F21V 8/00* (2006.01)

(52) U.S. Cl.
CPC ........... *G02B 6/005* (2013.01); *G02B 6/0055* (2013.01)

(58) Field of Classification Search
CPC .............................. G02B 6/005; G02B 6/0055
See application file for complete search history.

(56) References Cited

U.S. PATENT DOCUMENTS

| | | | | |
|---|---|---|---|---|
| 9,817,181 | B2 | 11/2017 | Fan | |
| 9,817,267 | B2 | 11/2017 | Cheng | |
| 2016/0003998 | A1 | 1/2016 | Benoit et al. | |
| 2017/0023728 | A1* | 1/2017 | Choi | G02F 1/133615 |
| 2018/0106940 | A1* | 4/2018 | Kim | G02B 6/005 |

FOREIGN PATENT DOCUMENTS

| | | |
|---|---|---|
| JP | 2016181474 | 10/2016 |
| KR | 10-1660163 | 9/2016 |
| KR | 10-1736680 | 5/2017 |

* cited by examiner

*Primary Examiner* — Joseph L Williams
(74) *Attorney, Agent, or Firm* — F. Chau & Associates, LLC

(57) ABSTRACT

A display apparatus includes a display panel configured to display an image. A light guide plate is disposed below the display panel. The light guide plate has a light incident surface. A light source is disposed adjacent to the light incident surface of the light guide plate to generate first light. A light conversion layer is disposed between the light guide plate and the display panel to convert a wavelength band of incident light. An optical filter layer is disposed between the light guide plate and the light conversion layer to selectively transmit or reflect incident light.

21 Claims, 8 Drawing Sheets

BACKLIGHT UNIT AND DISPLAY APPARATUS INCLUDING THE SAME

CROSS-REFERENCE TO RELATED APPLICATIONS

This U.S. non-provisional patent application claims priority under 35 U.S.C. § 119 to Korean Patent Application No. 10-2018-0000843, filed on Jan. 3, 2018, the entire contents of which are hereby incorporated by reference.

TECHNICAL FIELD

The present disclosure relates to a display apparatus, and more particularly, to a backlight unit and a display apparatus including the same.

DISCUSSION OF THE RELATED ART

A display apparatus may include a display panel that has a plurality of pixels disposed thereon. Each pixel may include one or more thin-film transistors for controlling the operation thereof. While some display panels, such as organic light emitting diode (OLED) display panels, may be emissive-type, and thereby generate their own light, other display panels, such as liquid crystal display panels, may be non-emissive, and may therefore require a backlight unit to provide light to the display panel. Some backlight units are considered "direct backlight." Direct backlight units may sit behind the display panel so as to provide light directly to the display panel. While direct backlight units may provide a very even distribution of light, such units tend to add thickness to the display device. Other backlight units are considered "edge lit" backlight units. These backlight units may include a light source and a light guide plate. The light source may be disposed along an edge of the display panel. Light generated from the light source is guided in the light guide plate and provided to the display panel.

SUMMARY

A display apparatus includes a display panel configured to display an image. A light guide plate is disposed below the display panel. The light guide plate has a light incident surface. A light source is disposed adjacent to the light incident surface of the light guide plate to generate first light. A light conversion layer is disposed between the light guide plate and the display panel to convert a wavelength band of incident light. An optical filter layer is disposed between the light guide plate and the light conversion layer to selectively transmit or reflect incident light.

A backlight unit includes a light guide plate having a light incident surface. A light source is disposed adjacent to the light incident surface of the light guide plate. The light source is configured to generate first light having a first wavelength band. A light conversion layer is disposed on the light guide plate and is configured to convert a wavelength band of incident light. An optical filter layer is disposed between the light guide plate and the light conversion layer to selectively transmit or reflect incident light according to a wavelength band of the incident light and an incident angle of the incident light.

A display apparatus includes a display panel. A light source is disposed at a side of the display panel. A light guide plate is configured to guide light from the light source to the display panel. An optical filter layer is disposed on a first surface of the light guide plate, between the light guide plate and the display panel. A low refractive layer is disposed on the optical filter layer, between the optical filter layer and the display panel. A light conversion layer is disposed on the low refractive layer between the low refractive layer and the display panel. A reflector is disposed on a second surface of the light guide plate. A refractive index of the light guide plate is greater than a refractive index of the low refractive layer and a refractive index of the light conversion layer is greater than the refractive index of the light guide plate. The optical filter layer includes a first insulation film and a second insulation film alternately and repeatedly stacked. A refractive index of the first insulation film is different than a refractive index of the second insulation film.

BRIEF DESCRIPTION OF THE FIGURES

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

Figure 1:
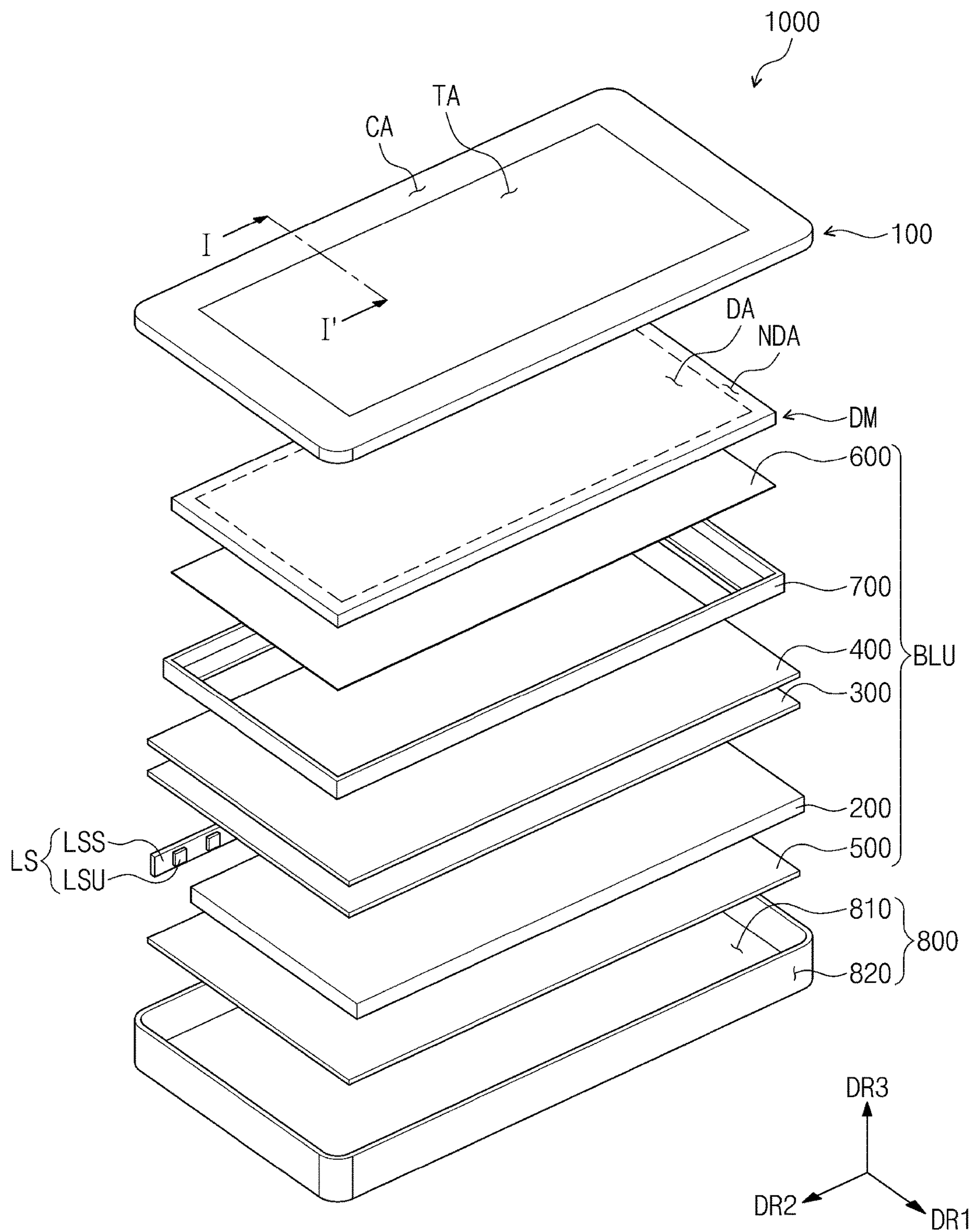
FIG. 1 is an exploded perspective view illustrating an entire display apparatus according to an exemplary embodiment of the present inventive concept.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner. Like reference numerals may refer to like elements throughout the specification and figures.

It will also be understood that when an element or a layer is referred to as being "on" another element or layer, it can be directly on the other element or layer, or intervening elements or layers may also be present.

Spatially relative terms, such as "below", "beneath", "lower", "above", "upper" and the like, may be used herein for ease of description to describe one element or feature's relationship to another element(s) or feature(s) as illustrated in the figures. The spatially relative terms should be understood as terms which include different directions of configurative elements in addition to directions illustrated in the figures when using or operating the inventive concept.

It will be understood that although the terms of first and second are used herein to describe various elements and/or sections, these elements and/or sections should not be limited by these terms. These terms are only used to distinguish one element, component, or section from another element, component, or section. Accordingly, a first element, a first component, or a first section that will be described below may be a second element, a second component, or a second section within the technical idea of the present disclosure.

Hereinafter, exemplary embodiments of the inventive concept will be described below in more detail with reference to the accompanying drawings.

Figure 2:
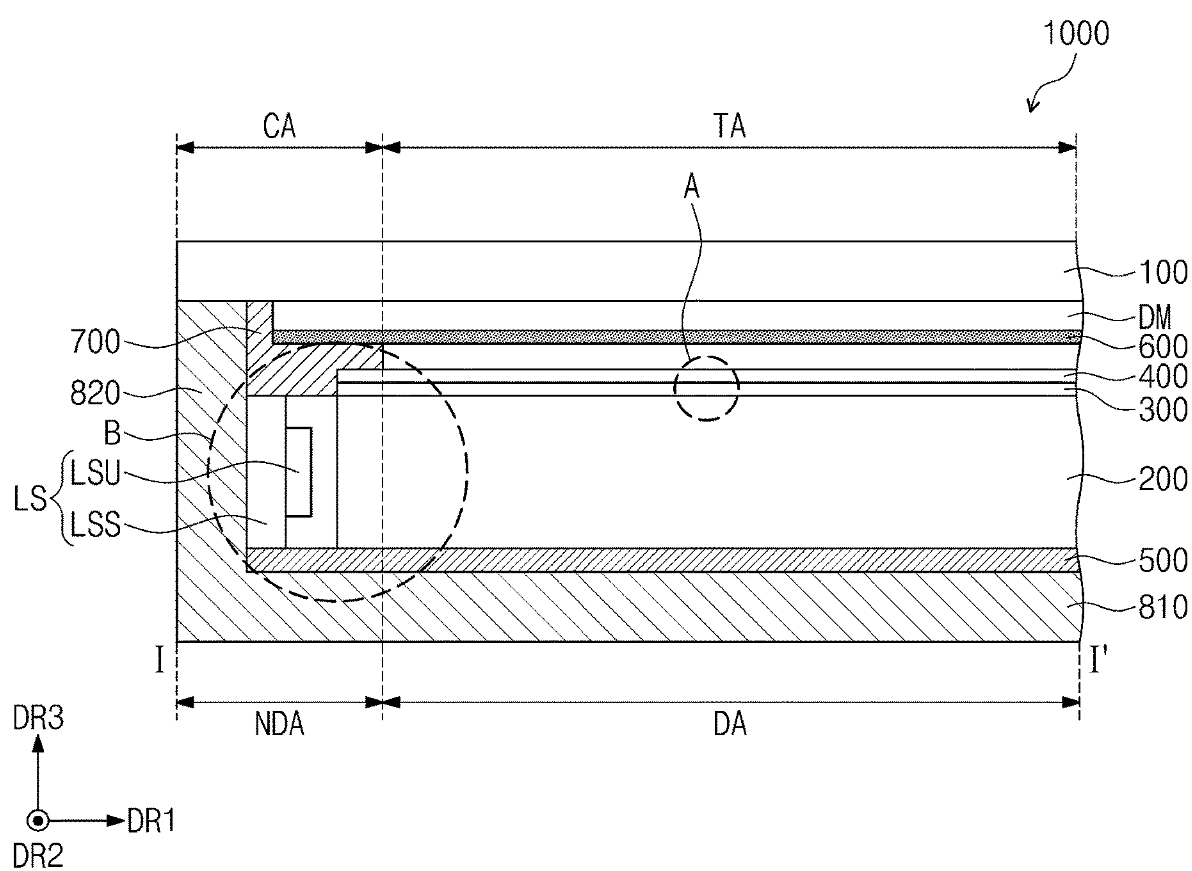
FIG. 2 is a cross-sectional view taken along line I-I' of FIG. 1.

FIG. 1 is an exploded perspective view illustrating an entire display apparatus according to an exemplary embodiment of the present inventive concept, and FIG. 2 is a cross-sectional view taken along line I-I' of FIG. 1.

Referring to FIGS. 1 and 2, a display apparatus 1000, according to an exemplary embodiment of the present inventive concept, has a rectangular shape having a pair of short sides extending in a first direction DR1 and a pair of long sides extending in a second direction DR2. However, the present inventive concept is not limited to having the shape of the display apparatus 1000 being rectangular. For example, the display apparatus may have various shapes.

The display apparatus 1000 includes a window member 100, a display member DM, a backlight unit BLU, and an accommodation member 800.

Here, for convenience of description, a direction in which an image is provided in the display apparatus 1000 is defined as an upward direction, and a direction opposite to the upward direction is defined as a downward direction. In these figures, each of the upward and downward directions is parallel to a third direction DR3 that is perpendicular to each of the first and second directions DR1 and DR2. The third direction DR3 may be a reference direction for distinguishing the front and rear surfaces of each of components that will be described later. However, the upward direction and the downward direction may be relative concepts, and thus may be reversed with respect to each other.

The window member 100 includes a light transmission part TA, allowing an image provided from the display member DM to be transmitted therethrough, and a light shielding part CA disposed adjacent to the transmission part TA and through which an image is not transmitted. The light transmission part TA is disposed on a central portion of the display apparatus 1000 on a plane defined by the first direction DR1 and the second direction DR2. The light shielding part CA has a frame shape disposed around the light transmission part TA to at least partially surround the light transmission part TA.

The window member 100 may be made of a transparent material, such as a material containing glass, sapphire, or plastic.

The display member DM is disposed below the window member 100. The display member DM displays an image by using light provided from the backlight unit BLU. For example, the display member DM may be a non-emissive type display panel. For example, according to an exemplary embodiment of the present inventive concept, the display member DM may be a liquid crystal display panel.

A surface of the display member DM, on which an image is displayed, is defined as a display surface. The display surface includes a display area DA on which an image is displayed and a non-display area NDA on which an image is not displayed. The display area DA is disposed on a central portion of the display member DM to overlap the light transmission part TA of the window member 100.

The backlight unit BLU is disposed below the display member DM to provide light to the display member DM. According to exemplary embodiments of the present inventive concept, the backlight unit BLU may be an edge-type backlight unit.

The backlight unit BLU includes a light source LS, a light guide member 200, an optical filter layer 300, a light conversion layer 400, a reflective sheet 500, an optical member 600, and a mold frame 700.

The light source LS is disposed adjacent to one side of the light guide member 200 in the first direction DR1. However, the inventive concept is not limited in the position of the light source LS. For example, the light source LS may be disposed adjacent to at least one side surface of the light guide member 200. This one side surface, which is adjacent to the light source LS of the light guide member 200, is defined as a light incident surface IS (refer to FIG. 9).

The light source LS includes a plurality of light source units LSU and a light source board LSS.

The light source units LSU generate light to be provided to the display member DM, thereby providing the generated light to the light guide member 200.

According to exemplary embodiments of the present inventive concept, the light source units LSU may generate first light. The first light may have a first wavelength band. For example, the first wavelength band may be equal to or greater than about 400 nm and equal to or less than about 500 nm. For example, the light source units LSU may generate substantially blue light.

According to exemplary embodiments of the present inventive concept, each of the light source units LSU may use a light emitting diode (LED) as a point light source. However, the inventive concept is not limited in the kind of the light source units LSU that may be used.

The present inventive concept is not limited in the number of the light source units LSU that may be provided. According to an exemplary embodiment of the present inventive concept, the light source unit LSU may be provided with a single LED as a point light source instead of a plurality of LEDs, or provided with a plurality of LED groups. Also, according to an exemplary embodiment of the present inventive concept, the light source units LSU may have a line light source configuration in which LEDs are disposed along a line.

The light source units LSU may be mounted on the light source board LSS. The light source board LSS is disposed to face one side of the light guide member 200 in the first direction DR1 and extend in the second direction DR2. The light source board LSS may include a light source control unit connected to the light source units LSU. The light source control unit may be configured to analyze an image displayed on the display member DM to output a local dimming signal, and control the brightness of light generated by the light source units LSU in response to the local dimming signal. According to an exemplary embodiment of the present inventive concept, the light source control unit may be mounted on a separate circuit board. However, the present inventive concept is not particularly limited to a particular mounted position of the light source control unit.

The light guide member 200 may include a material having a high transmittance of visible light. For example, the light guide member 200 may include a glass material. In an exemplary embodiment of the present inventive concept, the light guide member 200 may include a transparent polymer resin such as polymethyl methacrylate (PMMA). The light guide member 200 may have a refractive index equal to or greater than about 1.4 and equal to or less than about 1.55.

The optical filter layer 300 is disposed on the light guide member 200. The optical filter layer 300 allows incident light to be selectively transmitted or reflected. The optical filter layer 300, according to exemplary embodiments of the present inventive concept, may have a shape in which a plurality of insulation films are alternately laminated. Hereinafter, the optical filter layer 300 will be described in detail with reference to FIGS. 5 to 9.

The light conversion layer 400 is disposed on the optical filter layer 300. For example, the light conversion layer 400 faces the light guide member 200 with the optical filter layer 300 disposed therebetween. The light conversion layer 400 converts a wavelength band of incident light. The light conversion layer 400 may have a refractive index greater than that of the light guide member 200. For example, the light conversion layer 400 may have a refractive index equal to or greater than about 1.65. Hereinafter, the light conversion layer 400 will be described in more detail later in FIG. 3.

According to an exemplary embodiment of the inventive concept, the light conversion layer 400 may be formed on a top surface of the optical filter layer 300 through a coating process. However, the light conversion layer 400 may be alternatively disposed. For example, according to an exemplary embodiment of the present inventive concept, a sheet-type optical conversion layer 400 may be disposed on the optical filter layer 300.

The reflective sheet 500 may be disposed below the light guide member 200. The reflective sheet 500 reflects light emitted below the light guide member 200 in an upward direction. The reflective sheet 500 includes a light reflecting material. For example, the reflection sheet 500 may include aluminum and/or silver.

The optical member 600 is disposed between the light conversion layer 400 and the display member DM. Light provided to the optical member 600 from the light conversion layer 400 may be diffused and collected by the optical member 600 and then provided to the display member DM.

The optical member 600, according to an exemplary embodiment of the present inventive concept, may include a plurality of sheets. For example, the optical member 600 may include a diffusion sheet, a prism sheet, and a protective sheet. The diffusion sheet may diffuse the light provided from the light conversion layer 400. The prism sheet may be disposed on the diffusion sheet to collect the light diffused by the diffusion sheet in an upward direction perpendicular to a plane of the optical member 600 and the various sheets.

The protective sheet may protect prisms of the prism sheet from external friction. The optical member 600 may include various other sheets for changing optical characteristics.

The mold frame 700 is disposed between the light guide member 200 and the optical member 600. The mold frame 700, according to an exemplary embodiment of the present inventive concept, has a frame shape. For example, the mold frame 700 may be disposed in correspondence to an edge of the light guide member 200 on a top surface of the light guide member 200. The display member DM and the optical member 600 may be seated on the mold frame 700. The mold frame 700 serves to fix the display member DM, the optical member 600, and the backlight unit BLU.

The accommodation member 800 is disposed as the bottommost section of the display apparatus 100 to accommodate the backlight unit 200 therein. The accommodation member 800 includes a bottom part 810 and a plurality of sidewalls 820 connected to the bottom part 810. In an exemplary embodiment of the present inventive concept, the light source LS may be disposed on an inside surface of one of the sidewalls 820 of the accommodation member 800. The accommodation member 800 may include a rigid metallic material.

Figure 3:
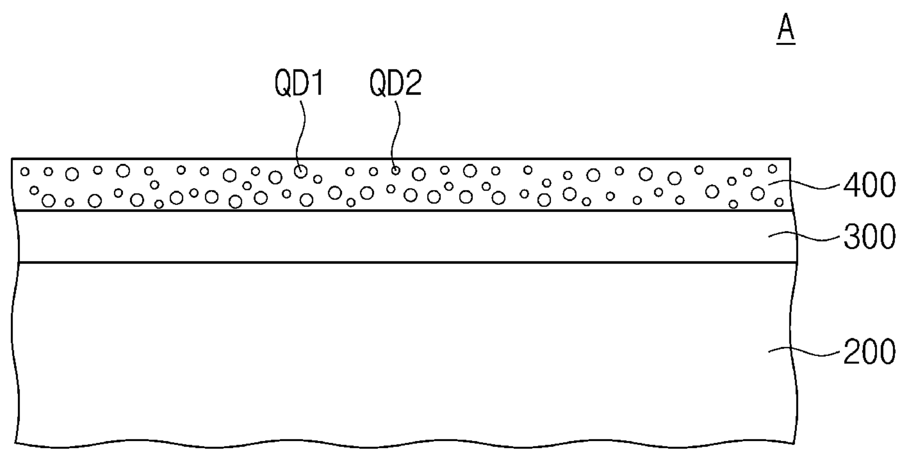
FIG. 3 is an enlarged view illustrating a region A of FIG. 2.

FIG. 3 is an enlarged view illustrating a region A in FIG. 2.

Referring to FIG. 3, the optical conversion layer 400, according to an exemplary embodiment of the present inventive concept, may include a plurality of conversion particles. Each of the conversion particles absorbs at least a portion of incident light to discharge light having a specific color or allow the absorbed light to be transmitted.

When the light incident into the light conversion layer 400 has sufficient energy for exciting the conversion particles, the conversion particles adsorb at least a portion of the incident light and are converted into an excited state. The excited conversion particles then discharge light having a specific color, while returning to a ground state. Alternatively, when the incident light dose not have sufficient energy for exciting the conversion articles, the incident light may transmit through the light conversion layer 400 unchanged.

For example, the color of light emitted by the conversion particles may be determined according to the particle size of the conversion particles. In general, as the particle size is larger, light having a longer wavelength is generated, and, as the particle size is smaller, light having a shorter wavelength is generated.

According to exemplary embodiments of the present inventive concept, each of the conversion particles may be a quantum dot (QD). The light emitted from the conversion particles of the light conversion layer 400 may be emitted in various directions.

For example, the conversion particles include first quantum dots QD1 and second quantum dots QD2. Each of the first quantum dots QD1 may adsorb first light and convert the absorbed first light into second light having a second wavelength band. The second wavelength band has a center wavelength greater than that of the first wavelength band. For example, the second wavelength band may be equal to or greater than about 640 nm and equal to or less than about 780 nm. For example, each of the first quantum dots QD1 may substantially convert blue light into red light.

Each of the second quantum dots QD2 may adsorb first light and convert the absorbed first light into third light having a third wavelength band. The third wavelength band has a center wavelength greater than that of the first wavelength band and less than that of the second wavelength band. For example, the third wavelength band may be equal to or greater than about 480 nm and equal to or less than about 560 nm. For example, each of the second quantum dots QD2 may substantially convert blue light into green light.

As described above, the wavelength of the light generated by the corresponding conversion particles may be determined according to the particle size of the conversion particles. According to an exemplary embodiment of the present inventive concept, each of the first quantum dots QD1 may have a size greater than that of each of the second quantum dots QD2.

The light conversion layer 400 may further include scatters. The scatters may be mixed together with the first quantum dots QD1 and the second quantum dots QD2.

Figure 4:
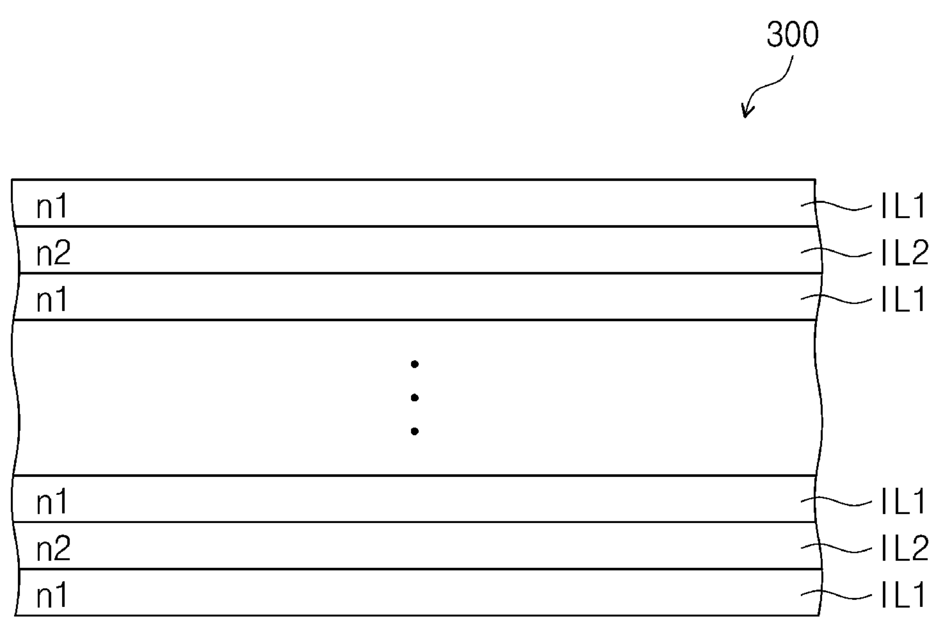
FIG. 4 is an enlarged cross-sectional view illustrating an optical filter layer according to an exemplary embodiment of the present inventive concept.

FIG. 4 is an enlarged cross-sectional view illustrating an optical filter layer according to an exemplary embodiment of the present inventive concept.

Referring to FIG. 4, the optical filter layer 300 may include a plurality of insulation films. The insulation films may include a first insulation film IL1 and a second insulation film IL2. Each of the first insulation film IL1 and the second insulation film IL2 may be provided in plural to be alternately laminated. According to an exemplary embodiment of the present inventive concept, the first insulation films IL1 may be disposed as both an uppermost and bottommost layer of the optical filter layer 300.

The first insulation film IL1 and the second insulation film IL2 have refractive indexes different from each other. For example, the first insulation film IL1 has a first refractive index n1. According to an exemplary embodiment of the present inventive concept, the first refractive index n1 may be about 2.0. For example, the first insulation film IL1 may include silicon nitrite (SiNx), titanium oxide (TiOx), tantalum oxide (TaOx), and/or zinc oxide (ZrOx).

The second insulation film IL2 has a second refractive index n2. The second refractive index n2 is less than the first refractive index n1. According to an exemplary embodiment of the present inventive concept, the second refractive index n2 may be about 1.5. For example, the second insulation film IL2 may include silicon oxide (SiOx) and/or magnesium fluoride (MgF).

Each of the first insulation film IL1 and the second insulation film IL2 may have a thickness that is determined by the refractive index thereof. For example, when the center wavelength of the light incident into the optical filter layer 300 is defined as λ, each of the first insulation layers IL1 has a thickness of about λ/4n1, and each of the first insulation layers IL1 has a thickness of about λ/4n2.

Accordingly, the laminated number of the first and second insulation layers IL1 and IL2 constituting the optical filter layer 300 may be determined according to the thickness of each of the first and second insulation layers IL1 and IL2. For example, the first insulation layers IL1 and the second insulation layers IL2 may form 20 layers or less.

Figure 5:
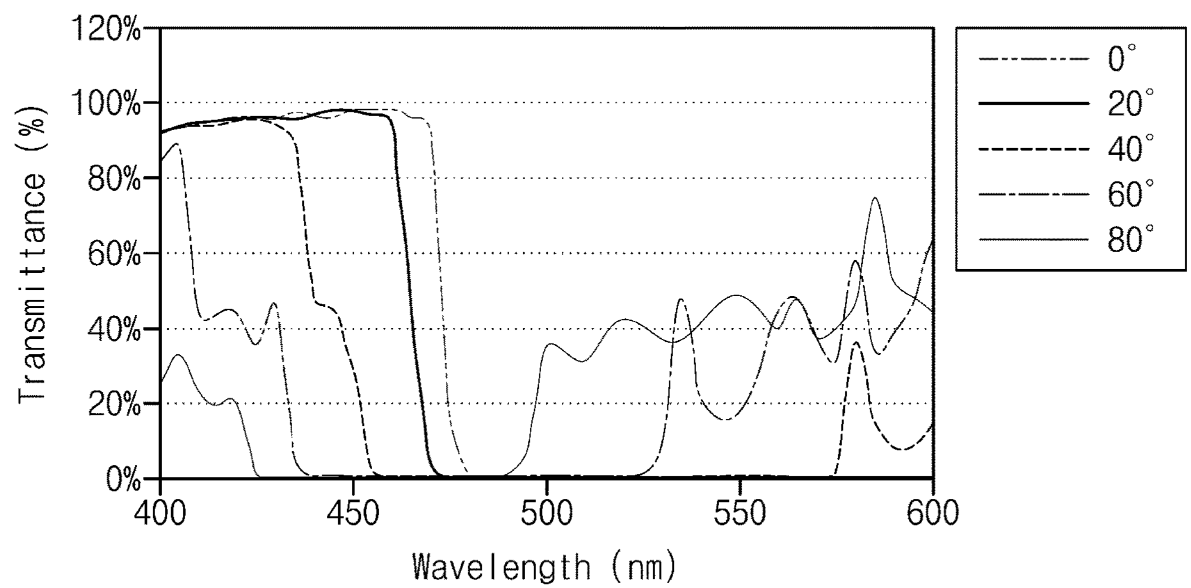
FIG. 5 is a graph showing transmittance according to incident angle, when first light having a first wavelength band is incident into an optical filter layer.

FIG. 5 is a graph showing a transmittance for each wavelength band of an optical filter layer.

Referring to FIG. 5, an angle θ1, θ2, or θ3 (refer to FIG. 6) between the light incident into the optical filter layer 300 and a normal line of the bottommost surface of the optical filter layer 300 is defined as an incident angle.

According to an exemplary embodiment of the present inventive concept, the optical filter layer 300 may have a different transmittance according to an incident angle. For example, as the incident angle of the optical filter layer 300 increases, the transmission graph of the optical filter layer 300 may be blue-shifted. For example, as the incident angle increases, the wavelength band of light reflected by the optical filter layer 300 may move towards the short wavelength band.

Figure 6:
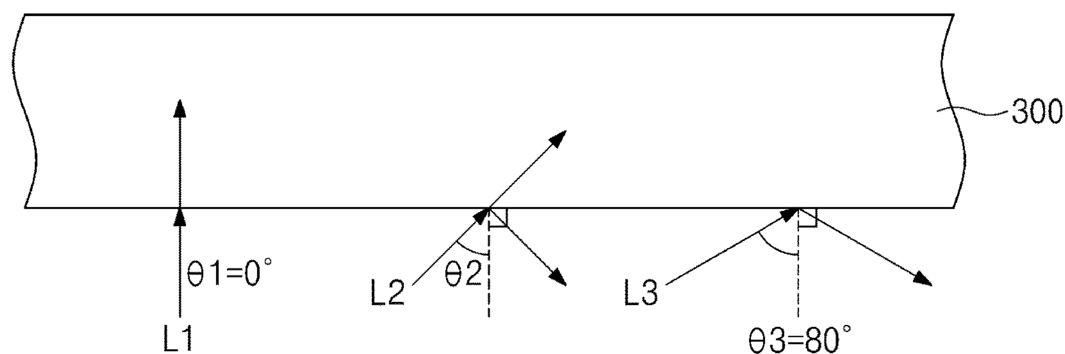
FIG. 6 is a diagram illustrating a light path of light incident into the optical filter layer according to an exemplary embodiment of the present inventive concept.
Figure 7:
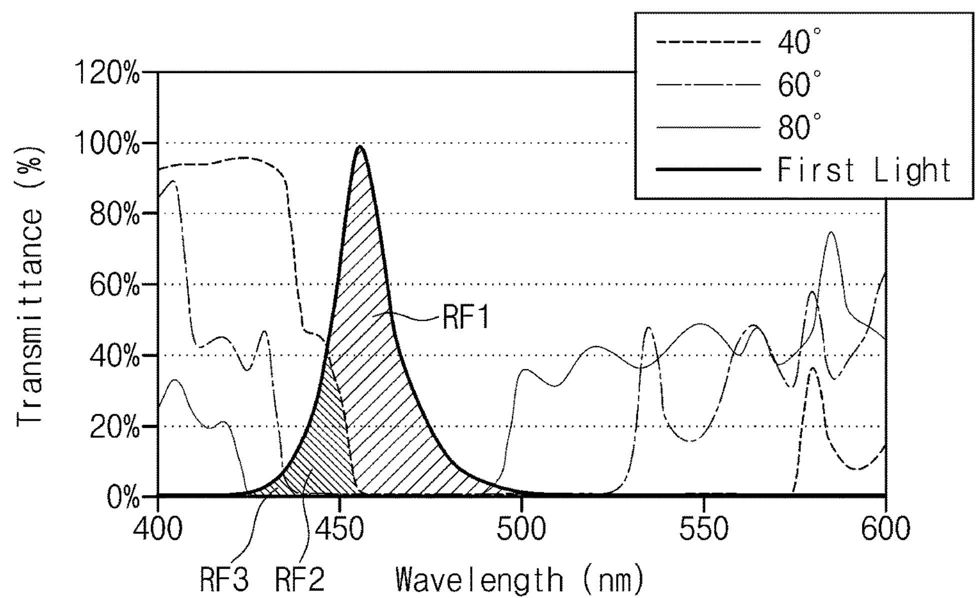
FIG. 7 is a graph showing a transmittance for each wavelength band of the optical filter layer.
Figure 8:
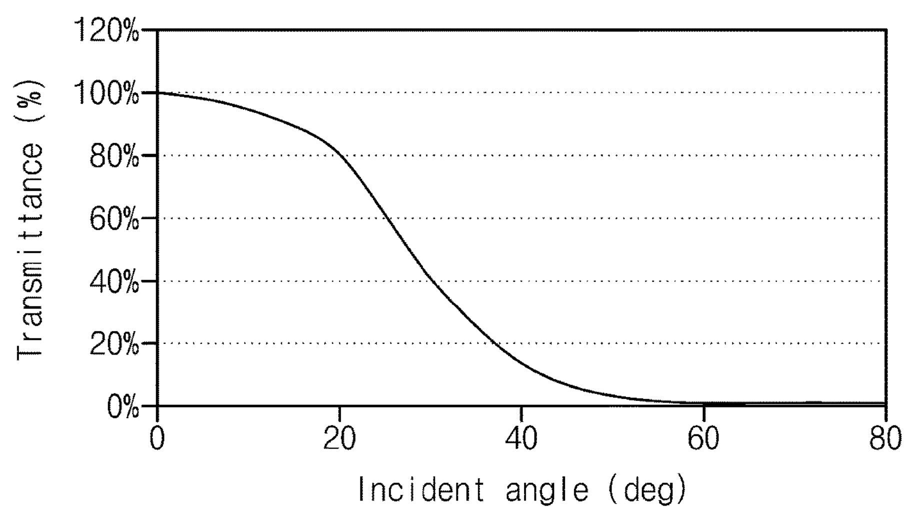
FIG. 8 is a graph showing a transmission wavelength band according to a first wavelength band and an incident angle of first light.

FIG. 6 is a view illustrating a light path of the light incident into the optical filter layer according to an exemplary embodiment of the present inventive concept, and FIG. 7 is a graph showing a transmission wavelength band according to the first wavelength band and the incident angle of the first light. FIG. 8 is a graph showing a transmittance according to the incident angle when the first light having the first wavelength band is incident into the optical filter layer.

As previously described, the first light has the first wavelength band equal to or greater than about 400 nm and equal to or less than about 500 nm. Referring to FIGS. 6 to 8, when the first light having the first wavelength band is incident into the optical filter layer 300, as the incident angle (θ1, θ2, or θ3) increases, the transmittance of the optical filter layer 300 with respect to the first light may decrease. For example, as the incident angle (θ1, θ2, or θ3) of the first light increases, a reflected amount of the optical filter layer 300 with respect to the first light may increase.

For example, when the first light L1 having the incident angle θ1 of about 0° is incident into the optical filter layer 300, most of the first light L1 transmits through the optical filter layer 300.

When the light L2 having the incident angle θ2 that is greater than about 0° and less than about 80° is incident into the optical filter layer 300, a portion of the light L2 transmits through the optical filter layer 300, and the rest of the optical filter layer 300 is reflected. For example, when the incident angle θ2 is about 40°, the amount of light reflected by the optical filter layer 300 corresponds to a first reflected amount RF1 in FIG. 7. When the incident angle θ2 is about 60°, the amount of light reflected by the optical filter layer 300 corresponds to a sum of the first reflected amount RF1 and a second reflected amount RF2 in FIG. 7.

When the light L3 having the incident angle θ3 of about 80° is incident into the optical filter layer 300, most of the light L3 is reflected by the optical filter layer 300. The light amount of the light L3 reflected by the optical filter layer 300 corresponds to a sum of the first reflected amount RF1, the second reflected amount RF2, and the third reflected amount RF3.

Figure 9:
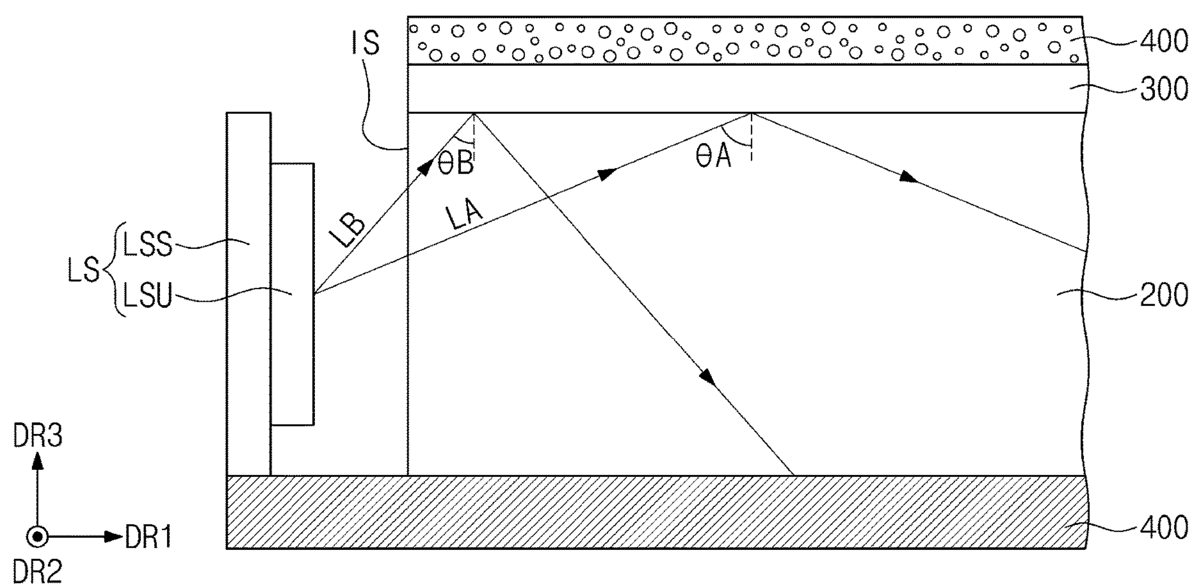
FIG. 9 is an enlarged view illustrating a region B of FIG. 2.

FIG. 9 is an enlarged view illustrating a region B in FIG. 2. Hereinafter, FIG. 9 will be described with reference to FIG. 8.

First incident light LA of light provided to the light incident surface IS of the light guide member 200 in the light source units LSU transmits through the light guide member 200 without being guided by the light guide member 200. The first incident light LA that transmits through the light guide member 200 is incident to a boundary surface defined as a top surface of the light guide member 200 or a bottommost surface of the optical filter layer 300. The first incident light LA has a first incident angle θA with respect to a normal line of the boundary surface. The first incident angle θA may be greater than a critical angle of the light guide member 200. For example, the first incident angle θA may be equal to or greater than about 60°. Accordingly, light having the first incident angle θA may undergo total reflection by the top surface of the light guide member 200.

Second incident light LB of the light provided to the light incident surface IS of the light guide member 200 in the light source units LSU transmits through the light guide member 200 and is incident to the boundary surface without being guided by the light guide member 200. The second incident light LB has a second incident angle θB with respect to the normal line of the boundary surface. The second incident angle θB may have a value less than that of the critical angle. According to an exemplary embodiment of the present inventive concept, the second incident angle θB may be equal to or greater than about 45° and equal to or less than about 60°.

According to an exemplary embodiment of the present inventive concept, when the light incident into the optical filter layer 300 has a first wavelength band and an indent angle of about 45°, a transmittance of the optical filter layer 300 with respect to the light may be equal to or less than about 10%. For example, when an angle formed between the first light generated from the light source LS and the normal line of the bottommost surface of the optical filter layer 300 is equal to or greater than about 45°, about 90% or more of the first light may be reflected by the optical filter layer 300 and re-incident into the light guide member 200. For example, about 90% or more of the second incident light LB may be reflected by the optical filter layer 300 and re-incident into the light guide member 200.

When the optical filter layer 300 is not disposed on the light guide member 200, the second incident light LB that is incident to the top surface of the light guide member 200 with the second incident angle θB having a value less than that of the critical angle may transmits through the light guide member 200 instead of being reflected by the top surface of the light guide member 200, and may then be provided to the light conversion layer 400. The second incident light LB incident into the light conversion layer 400 may be converted in wavelength band and provided to the display member DM. Accordingly, the second incident light LB is emitted from the light guide member 200 instead of being guided by the light guide member 200, to increase the brightness of the light incident part. For example, the brightness uniformity of the display apparatus 1000 may be degraded. However, according to an exemplary embodiment of the present inventive concept, although the second incident light LB has an incident angle less than the critical angle, about 90% or more of the second incident light may be reflected by the optical filter layer 300 and provided into the light guide member 200 again. Accordingly, the brightness uniformity of the display apparatus 1000 may be increased.

Figure 10:
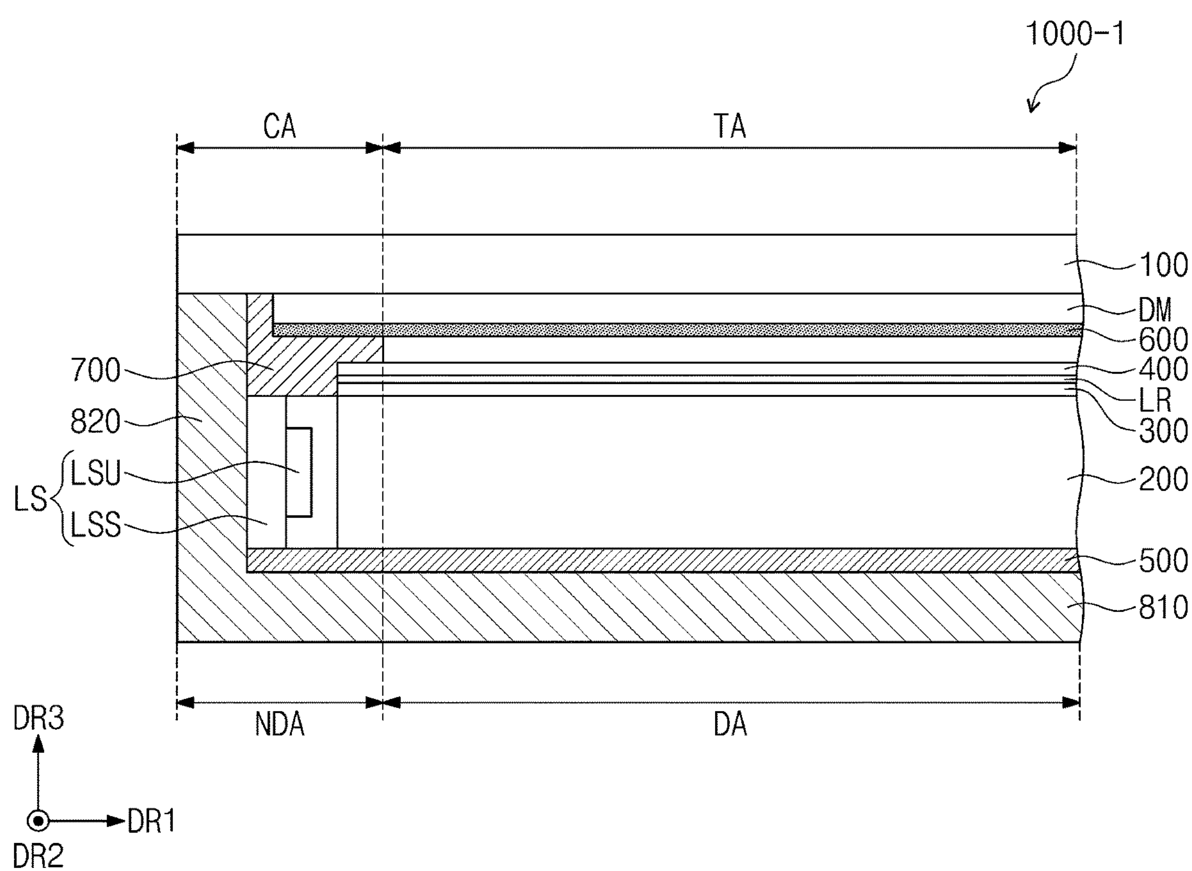
FIG. 10 is a cross-sectional view illustrating a display apparatus according to an exemplary embodiment of the present inventive concept.
Figure 11:
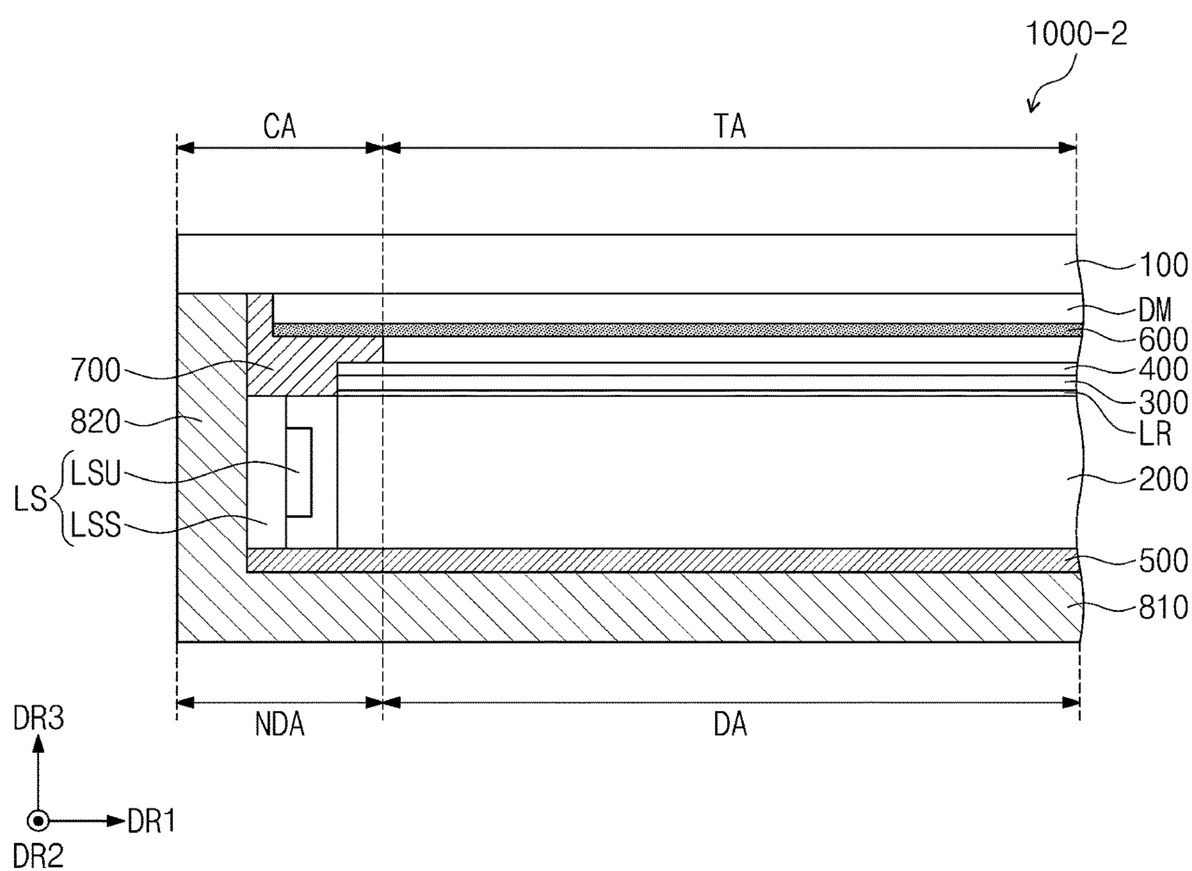
FIG. 11 is a cross-sectional view illustrating a display apparatus according to an exemplary embodiment of the present inventive concept.

FIGS. 10 and 11 are cross-sectional views illustrating a display apparatus according to an exemplary embodiment of the present inventive concept.

For convenience in description, aspects different from those in the embodiment of the inventive concept will be mainly described, and omitted aspects may be understood to be the same as those corresponding elements that have already been described.

Each of display apparatuses 1000-1 and 1000-2, according to various exemplary embodiments of the present inventive concept, further includes a low refractive layer LR. The low refractive layer LR has a third refractive index. The third refractive index has a value less than that of each of the first refractive index and the second refractive index. For example, the third refractive index is less than that of the optical filter layer 300. For example, the third refractive index may be equal to or greater than about 1.15 and equal to or less than about 1.35.

As illustrated in FIG. 10, the low refractive layer LR may be disposed between the optical filter layer 300 and the light conversion layer 400. The low refractive layer LR serves to attach the optical filter layer 300 and the optical conversion layer 400 to each other. However, the present inventive concept is not particularly limited to the function of the low refractive layer LR. For example, the low refractive layer LR may be disposed on the uppermost portion of the optical filter layer 300 to perform an optical function with respect to the incident light.

Also, as illustrated in FIG. 11, the low refractive layer LR may be disposed between the light guide member 200 and the optical filter layer 300. The low refractive layer LR has a bottom surface that directly contacts the top surface of the light guide member 200. The low refractive layer LR serves to attach the optical filter layer 300 and the light guide member 200 to each other. However, the present inventive concept is not particularly limited to the function of the low refractive layer LR. For example, the low refractive layer LR may be disposed on the bottommost portion of the optical filter layer 300 to serve as a base member of the optical filter layer 300 or perform an optical function with respect to the incident light.

According to an exemplary embodiment of the present inventive concept, the display apparatus may have increased display quality. For example, according to an exemplary embodiment of the present inventive concept, the display apparatus may have increased brightness uniformity.

Although exemplary embodiments of the present invention have been described, it is understood that the present invention should not be limited to these exemplary embodiments but various changes and modifications can be made by one ordinary skilled in the art within the spirit and scope of the present invention.

What is claimed is:

1. A display apparatus comprising:

a display panel configured to display an image;

a light guide plate disposed below the display panel, the light guide plate having a light incident surface that is defined on at least one side surface thereof;

a light source disposed adjacent to the light incident surface of the light guide plate to generate first light;

a light conversion layer disposed between the light guide plate and the display panel to convert a wavelength band of incident light; and an optical filter layer disposed between the light guide plate and the light conversion layer to selectively transmit or reflect incident light.

2. The display apparatus of claim 1, wherein an angle formed between the light incident into the optical filter layer and a normal line of a bottommost surface of the optical filter layer is defined as an incident angle, and wherein as the incident angle with respect to the first light increases, a transmittance of the optical filter layer with respect to the first light decreases.

3. The display apparatus of claim 1, wherein an angle formed between the light incident into the optical filter layer and a normal line of a bottommost surface of the optical filter layer is defined as an incident angle, and wherein a transmittance of the optical filter layer with respect to light having the wavelength band of the first light and the incident angle of about 45° or more is about 10% or less.

4. The display apparatus of claim 3, wherein an angle formed between the light incident into the light guide plate from the light source and the normal line of the bottommost surface of the optical filter layer is about 45° or more.

5. The display apparatus of claim 3, wherein the first light is blue light.

6. The display apparatus of claim 1, wherein the light conversion layer comprises a plurality of quantum dots.

7. The display apparatus of claim 6, wherein the plurality of quantum dots comprises:

a plurality of first quantum dots configured to absorb the first light and convert the absorbed first light into second light having a wavelength band different from that of the first light; and a plurality of second quantum dots configured to convert the first light into third light having a wavelength band different from that of each of the first light and the second light.

8. The display apparatus of claim 7, wherein each of the first quantum dots is greater in size than each of the second quantum dots.

9. The display apparatus of claim 1, wherein the optical filter layer comprises:

a plurality of first insulation films each having a first refractive index; and a plurality of second insulation films each having a second refractive index, and the first insulation films and the second insulation films are alternately laminated.

10. The display apparatus of claim 9, wherein the first refractive index is greater than the second refractive index.

11. The display apparatus of claim 9, wherein the first insulation films are disposed on topmost and bottommost portions of the optical filter layer, respectively.

12. The display apparatus of claim 1, further comprising a low refractive layer disposed between the optical filter layer and the optical conversion layer and having a third refractive index, and wherein the third refractive index is less than a refractive index of the optical filter layer.

13. The display apparatus of claim 1, further comprising a low refractive layer disposed between the light guide plate and the optical filter layer and having a third refractive index, and wherein the third refractive index is less than a refractive index of the optical filter layer.

14. A backlight unit comprising:

a light guide plate having a light incident surface;

a light source disposed adjacent to the light incident surface of the light guide plate, the light source configured to generate first light having a first wavelength band;

a light conversion layer disposed on the light guide plate and configured to convert a wavelength band of incident light; and an optical filter layer disposed between the light guide plate and the light conversion layer to selectively transmit or reflect incident light according to a wavelength band of the incident light and an incident angle of the incident light.

15. The backlight unit of claim 14, wherein an angle formed between the light incident into the optical filter layer and a normal line of a bottommost surface of the optical filter layer is defined as an incident angle, and wherein as the incident angle with respect to the first light increases, a transmittance of the optical filter layer with respect to the first light decreases.

16. The backlight unit of claim 15, wherein when the incident angle is about 45° or more, the transmittance of the optical filter layer with respect to the first light is about 10% or less.

17. The backlight unit of claim 14, wherein the optical conversion layer comprises a plurality of first quantum dots configured to convert the first light provided from the optical filter layer into second light having a second wavelength band, and wherein a center wavelength of the first wavelength band is less than that of the second wavelength band.

18. The backlight unit of claim 17, wherein the light conversion layer further comprises a plurality of second quantum dots configured to convert the first light provided from the optical filter layer into third light having a third wavelength band, and wherein a center wavelength of the third wavelength band is less than that of the second wavelength band, and greater than that of the first wavelength band.

19. The backlight unit of claim 14, wherein the optical filter layer comprises:

a plurality of first insulation films each of which having a first refractive index; and a plurality of second insulation films each of which having a second refractive index that is less than the first refractive index, and the first insulation films and the second insulation films are alternately laminated.

20. The backlight unit of claim 14, further comprising a low refractive layer disposed between the light conversion layer and the light guide plate and having a refractive index less than that of each of the light conversion layer and that of the light guide member.

21. A display apparatus, comprising:

a display panel;

a light source disposed at a side of the display panel;

a light guide plate is configured to guide light from the light source to the display panel;

an optical filter layer disposed on a first surface of the light guide plate, between the light guide plate and the display panel;

a low refractive layer disposed on the optical filter layer, between the optical filter layer and the display panel;

a light conversion layer disposed on the low refractive layer between the low refractive layer and the display panel; and a reflector disposed on a second surface of the light guide plate, wherein a refractive index of the light guide plate is greater than a refractive index of the low refractive layer and a refractive index of the light conversion layer is greater than the refractive index of the light guide plate, and wherein the optical filter layer includes a first insulation film and a second insulation film alternately and repeatedly stacked, and wherein a refractive index of the first insulation film is different than a refractive index of the second insulation film.

* * * * *